US012669089B2

(12) United States Patent
Flynn

(10) Patent No.: US 12,669,089 B2
(45) Date of Patent: Jun. 30, 2026

(54) MODULAR POWER GENERATION STATION AND CONFIGURATION

(71) Applicant: Brian M. Flynn, Oreland, PA (US)

(72) Inventor: Brian M. Flynn, Oreland, PA (US)

( * ) Notice: Subject to any disclaimer, the term of this patent is extended or adjusted under 35 U.S.C. 154(b) by 0 days.

(21) Appl. No.: 19/076,843

(22) Filed: Mar. 11, 2025

(65) Prior Publication Data

US 2025/0290449 A1 Sep. 18, 2025

Related U.S. Application Data

(60) Provisional application No. 63/564,168, filed on Mar. 12, 2024.

(51) Int. Cl.
*F02C 7/18* (2006.01)
*F02C 6/00* (2006.01)

(52) U.S. Cl.
CPC ................ *F02C 7/185* (2013.01); *F02C 6/00* (2013.01); *F05D 2220/76* (2013.01); *F05D 2230/60* (2013.01); *F05D 2260/606* (2013.01)

(58) Field of Classification Search
CPC ........ F02C 7/185; F02C 6/00; F05D 2220/76; F05D 2230/60; F05D 2260/606
See application file for complete search history.

(56) References Cited

U.S. PATENT DOCUMENTS 3,453,443 A * 7/1969 Stoeckly ................... F02C 6/02
                                                                290/2
3,536,928 A * 10/1970 Jones, Jr. ................ F02B 63/04
                                                                290/2
3,791,682 A * 2/1974 Mitchell ................... F02C 7/20
                                                                290/1 R
4,117,342 A * 9/1978 Melley, Jr. ................ B60P 3/00
                                                                290/1 A
4,136,432 A * 1/1979 Melley, Jr. ................ B60P 3/00
                                                                29/469
5,095,221 A * 3/1992 Tyler ........................ F02C 9/54
                                                                290/40 C (Continued)

FOREIGN PATENT DOCUMENTS

GB          2360747 A * 10/2001    .............. F16M 3/00
WO    WO-2019045684 A1 * 3/2019    ............. A62C 35/02

(Continued)

*Primary Examiner* — Pedro J Cuevas
(74) *Attorney, Agent, or Firm* — LaMorte & Associates P.C.

(57) ABSTRACT

A power station created by joining two portable modules. The first module contains a turbine engine and an electrical generator. The second module contains air filters, an air cooling system, and a control room. The first module is placed in abutment with the second module. A first air conduit extends into the first module from the second module for providing air for use in combustion by the turbine. A second air conduit also extends into the first module. The second air conduit provides air for cooling the turbine. Intake fans are set into the second air conduit for drawing air into the first air conduit. The drawn air cools the turbine by passing through a radiator system in the first module. The system runs in a space efficient manner without hampering access for repairs and maintenance. Furthermore, control components can be isolated from the heat and vibrations of the system.

18 Claims, 4 Drawing Sheets

(56) References Cited

U.S. PATENT DOCUMENTS

| | | | | |
|---|---|---|---|---|
| 5,517,822 | A * | 5/1996 | Haws | F01K 23/103 |
| | | | | 122/1 R |
| 6,644,247 | B2 * | 11/2003 | Campion | H02P 9/04 |
| | | | | 290/51 |
| 6,688,048 | B2 * | 2/2004 | Staschik | E03D 5/003 |
| | | | | 52/220.1 |
| 6,765,304 | B2 * | 7/2004 | Baten | F02B 63/04 |
| | | | | 290/1 A |
| 6,786,051 | B2 * | 9/2004 | Kristich | F01D 15/10 |
| | | | | 60/796 |
| 6,895,903 | B2 * | 5/2005 | Campion | F02B 63/04 |
| | | | | 290/1 A |
| 7,007,966 | B2 * | 3/2006 | Campion | B60P 3/00 |
| | | | | 60/322 |
| 7,081,682 | B2 * | 7/2006 | Campion | F02B 63/04 |
| | | | | 123/3 |
| 7,122,913 | B2 * | 10/2006 | Witten | F02B 63/04 |
| | | | | 123/3 |
| 8,037,966 | B2 * | 10/2011 | Errera | F01N 5/04 |
| | | | | 181/204 |
| 8,495,869 | B2 * | 7/2013 | Beissler | F01N 13/002 |
| | | | | 60/275 |
| 8,587,136 | B2 * | 11/2013 | Williams | F01K 13/00 |
| | | | | 290/1 R |
| 8,680,728 | B2 * | 3/2014 | Errera | F02B 63/04 |
| | | | | 123/3 |
| 9,157,371 | B2 * | 10/2015 | Stratton | F02C 7/222 |
| 9,534,473 | B2 * | 1/2017 | Morris | F01D 15/10 |
| 10,030,579 | B2 * | 7/2018 | Austin | F16M 3/00 |
| 10,184,397 | B2 * | 1/2019 | Austin | F02C 6/00 |
| 10,202,896 | B2 * | 2/2019 | Brewer | E04H 5/04 |
| 10,337,402 | B2 * | 7/2019 | Austin | F16M 5/00 |
| 10,371,012 | B2 * | 8/2019 | Davis | F02B 63/047 |
| 10,374,485 | B2 * | 8/2019 | Morris | F01D 15/10 |
| 10,704,422 | B2 * | 7/2020 | Davis | F02C 7/24 |
| 10,704,472 | B2 * | 7/2020 | Davis | F02C 7/24 |
| 10,962,305 | B2 * | 3/2021 | Morris | F28D 21/001 |
| 11,053,853 | B2 * | 7/2021 | Li | F01D 25/28 |
| 11,125,156 | B2 * | 9/2021 | Zhang | H02K 7/1823 |
| 11,208,878 | B2 * | 12/2021 | Oehring | H01F 27/02 |
| 11,365,675 | B2 * | 6/2022 | Siebert | F16M 1/00 |
| 11,434,763 | B2 | 9/2022 | Morris et al. | |
| 11,512,632 | B2 * | 11/2022 | Morris | F02M 35/02416 |
| 11,512,906 | B2 * | 11/2022 | Morris | F28F 27/00 |
| 11,598,477 | B1 * | 3/2023 | Seldenrust | F16M 3/00 |
| 11,680,474 | B2 * | 6/2023 | Cui | H02K 7/1823 |
| | | | | 290/1 R |
| 11,725,582 | B1 * | 8/2023 | Morris | H02K 7/1823 |
| | | | | 60/39.092 |
| 11,788,519 | B2 * | 10/2023 | Zhang | F01D 25/30 |
| | | | | 417/313 |
| 12,085,018 | B2 * | 9/2024 | Morris | F02C 7/24 |
| 12,104,523 | B2 * | 10/2024 | Reyna | H02K 7/1815 |
| 12,163,435 | B1 * | 12/2024 | Morris | F01D 15/10 |
| 12,172,722 | B2 * | 12/2024 | Reyna | B62D 33/042 |
| 12,221,872 | B2 * | 2/2025 | Oehring | G05B 15/02 |
| 12,234,712 | B2 * | 2/2025 | Zhang | E21B 43/2607 |
| 12,286,049 | B2 * | 4/2025 | Cui | B60S 9/10 |
| 12,326,074 | B2 * | 6/2025 | Cui | F04B 49/02 |
| 12,381,440 | B2 * | 8/2025 | Breaux | H02K 5/207 |
| 12,410,695 | B2 * | 9/2025 | Li | E21B 43/2607 |
| 12,571,326 | B2 * | 3/2026 | Morris | F01D 15/10 |
| 2003/0030279 | A1 * | 2/2003 | Campion | F02B 63/04 |
| | | | | 290/1 A |
| 2003/0030281 | A1 * | 2/2003 | Campion | H02P 9/04 |
| | | | | 290/1 R |
| 2003/0033994 | A1 * | 2/2003 | Campion | F02B 63/04 |
| | | | | 123/41.56 |
| 2003/0057704 | A1 * | 3/2003 | Baten | F02B 63/04 |
| | | | | 290/3 |
| 2003/0079479 | A1 * | 5/2003 | Kristich | F01D 15/10 |
| | | | | 60/797 |
| 2009/0322096 | A1 * | 12/2009 | Errera | F02B 63/04 |
| | | | | 165/185 |
| 2012/0102929 | A1 * | 5/2012 | Beissler | F01N 13/002 |
| | | | | 60/297 |
| 2014/0157778 | A1 * | 6/2014 | Ponnuraj | F01D 25/30 |
| | | | | 60/694 |
| 2014/0210214 | A1 | 7/2014 | Campion et al. | |
| 2015/0027712 | A1 * | 1/2015 | Vicknair | E21B 43/162 |
| | | | | 166/305.1 |
| 2016/0177675 | A1 * | 6/2016 | Morris | F01D 15/10 |
| | | | | 166/308.1 |
| 2016/0248230 | A1 | 8/2016 | Tawy et al. | |
| 2017/0104389 | A1 * | 4/2017 | Morris | F01D 15/10 |
| 2019/0063263 | A1 * | 2/2019 | Davis | F01D 15/10 |
| 2019/0063308 | A1 * | 2/2019 | Davis | F02C 7/25 |
| 2019/0063326 | A1 * | 2/2019 | Davis | F02C 6/00 |
| 2019/0063341 | A1 * | 2/2019 | Davis | F02D 29/06 |
| 2019/0204021 | A1 * | 7/2019 | Morris | F28D 21/001 |
| 2020/0408071 | A1 * | 12/2020 | Li | F01D 25/30 |
| 2021/0025324 | A1 * | 1/2021 | Morris | H02K 9/26 |
| 2021/0086851 | A1 * | 3/2021 | Zhang | F01D 25/30 |
| 2021/0087916 | A1 * | 3/2021 | Zhang | F04B 47/00 |
| 2021/0102531 | A1 * | 4/2021 | Bodishbaugh | F04B 17/03 |
| 2021/0215440 | A1 * | 7/2021 | Morris | F02C 6/18 |
| 2022/0258659 | A1 * | 8/2022 | Cui | B60G 15/12 |
| 2022/0290549 | A1 * | 9/2022 | Zhang | E21B 43/2607 |
| 2022/0298906 | A1 * | 9/2022 | Zhong | E21B 43/2607 |
| 2023/0349325 | A1 * | 11/2023 | Morris | F01D 25/28 |
| 2025/0038618 | A1 * | 1/2025 | Morris | F01D 15/10 |
| 2025/0207506 | A1 * | 6/2025 | Morris | F01D 15/10 |
| 2025/0223921 | A1 * | 7/2025 | Zhang | F02C 7/24 |

FOREIGN PATENT DOCUMENTS

| | | | | |
|---|---|---|---|---|
| WO | WO-2019045687 A1 * | 3/2019 | | F01N 1/083 |
| WO | WO-2020223256 A1 * | 11/2020 | | F01D 25/30 |

* cited by examiner

MODULAR POWER GENERATION STATION AND CONFIGURATION

RELATED APPLICATIONS

This application claims the benefit of U.S. Provisional Application No. 63/564,168, filed Mar. 12, 2024.

BACKGROUND OF THE INVENTION

1. Field of the Invention

The present invention relates to the construction and configuration of power generation stations of the type that are premanufactured and assembled on-site. More particularly, the present invention relates to the layout of the modular premanufactured components used in the construction of the power generation station.

2. Background Description

There are many places on earth where there is either no reliable grid of electrical power, or a power grid that is inadequate for a particular need. Hospitals, factories, water treatment plants, and the like require a large steady supply of electrical power. As such, many places around the world construct small, dedicated power stations that can generate enough electricity for use in a particular building, facility, or village. There are many ways to create a dedicated power station, and many are custom built. A very efficient way to establish a dedicated power station is to purchase and assemble a premanufactured power station. Premanufactured power stations typically come with components that are the size of shipping containers, or they come within shipping containers. In this manner, the components can be easily transported using existing infrastructure and modes of transportation that are designed for shipping containers. The components are transported to a construction site as if they were shipping containers and then are assembled on-site.

All power stations that are powered by hydrocarbon fuel contain an electrical generator and the engine that is used to turn the electrical generator. Generally, the size of the electrical generator is proportional to the power that the electrical generator can produce. Thus, larger generators generally produce more power. However, the larger the electrical generator becomes, the larger the engine must be to turn that electrical generator. Furthermore, the engine requires a cooling system, air filters, and a fire suppression system. The overall power station also requires a control room to monitor and control the running of the engine and the electrical output of the generator. The control room requires room for at least one operator. Many premanufactured power stations attempt to design all of these required components into a single assembly that is no larger than one shipping container. Such prior art power station assemblies are exemplified in U.S. Pat. No. 11,434,763 to Morris. Since all components must fit into the space the size of a single shipping container, there are severe size limitations on both the engine and the electrical generator. As a consequence, diesel engines are typically used, and as a result, the overall electrical output of the power station is usually under 100,000 kilowatts.

In situations where more power generation is required, a power station with a larger electrical generator and a more powerful engine must be used. In such situations, a turbine engine is typically used due to its size-to-power ratio. However, turbine engines capable of turning large electrical generators tend to be significantly longer than corresponding diesel engines of comparable power. It therefore becomes difficult to fit all the components into the space of a single shipping container. In such situations, multiple shipping container sized units are utilized to hold all the required components. Once at the construction site, the different components are interconnected using pipes, cables, and conduits to create a functioning power plant. Typically, one container unit is used to hold the turbine and the generator. Other container units are then used to house control room operations, air filter operations, fire suppression operations and engine cooling operations. Such prior art power stations are exemplified by U.S. Patent Application Publication No. 2014/0210214 to Campion.

In the prior art, space is typically saved by stacking components atop a primary unit that retains the turbine engine and electrical generator. Such a configuration is shown in U.S. Patent Application Publication No. 2016/0248230 to Tawy and is later described in detail with reference to FIG. 1. Regardless of the fact that components are stacked upon the container unit holding the turbine engine and electrical generator, the turbine engine and electrical generator still require periodical maintenance. Furthermore, the turbine engine and electrical generator must occasionally be moved for repair or replacement. Vertically stacking components restrict access to the turbine engine and the electrical generator. This increases the time and costs of repair. It also decreases the safety to workers during maintenance and repair procedures, due to the limited available space and the heat generated by the running components. Accordingly, for the sake of safety, the turbine engine and/or electrical generator must be shut down to perform simple maintenance procedures.

A need therefore exists for a power station configuration that is modular yet enables the turbine to run uninterrupted as maintenance is routinely performed. A need also exists for a power station configuration that contains all the features needed to run a large turbine engine and electrical generator, yet can fit into the space of only two standard shipping container units. These needs are met by the present invention as described and claimed below.

SUMMARY OF THE INVENTION

The present invention is a power station configuration and method where a power station is created by joining two preassembled portable modules. The modules are sized to be no larger than shipping containers for ease of transportation. The portable first module contains a turbine engine and an electrical generator that is powered by the turbine engine. The portable second module contains air filters, an air cooling system, and a control room for operating the turbine engine and the electrical generator.

The first module is placed in abutment with said second module so that one wall of the first module abuts one wall of the second module. A first air conduit extends into the first module from the second module. The first air conduit provides air for use in combustion by the turbine. A second air conduit also extends into the first module from the second module. The second air conduit provides air for cooling the turbine. Intake fans are set into the second air conduit between the first wall and the second wall for drawing air through the second air conduit. The drawn air cools the turbine by passing through a radiator system in the first module.

By linearly aligning the first and second modules, the turbine engine and electrical generator can be run in a space efficient manner without hampering the ability to access the turbine engine and generator for repairs and maintenance. Furthermore, control components can be isolated from the heat and vibrations of the system, therein improving the life and durability of the system.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention system and methodology can be embodied in many ways, only one new exemplary embodiment is illustrated. A prior art embodiment is also illustrated for the sake of comparison. Both the prior art embodiment and the new exemplary embodiment are being shown for the purposes of explanation and description. The new exemplary embodiment is selected in order to set forth one of the best modes contemplated for the invention. The illustrated new embodiment, however, is merely exemplary and should not be considered a limitation when interpreting the scope of the appended claims.

Figure 1:
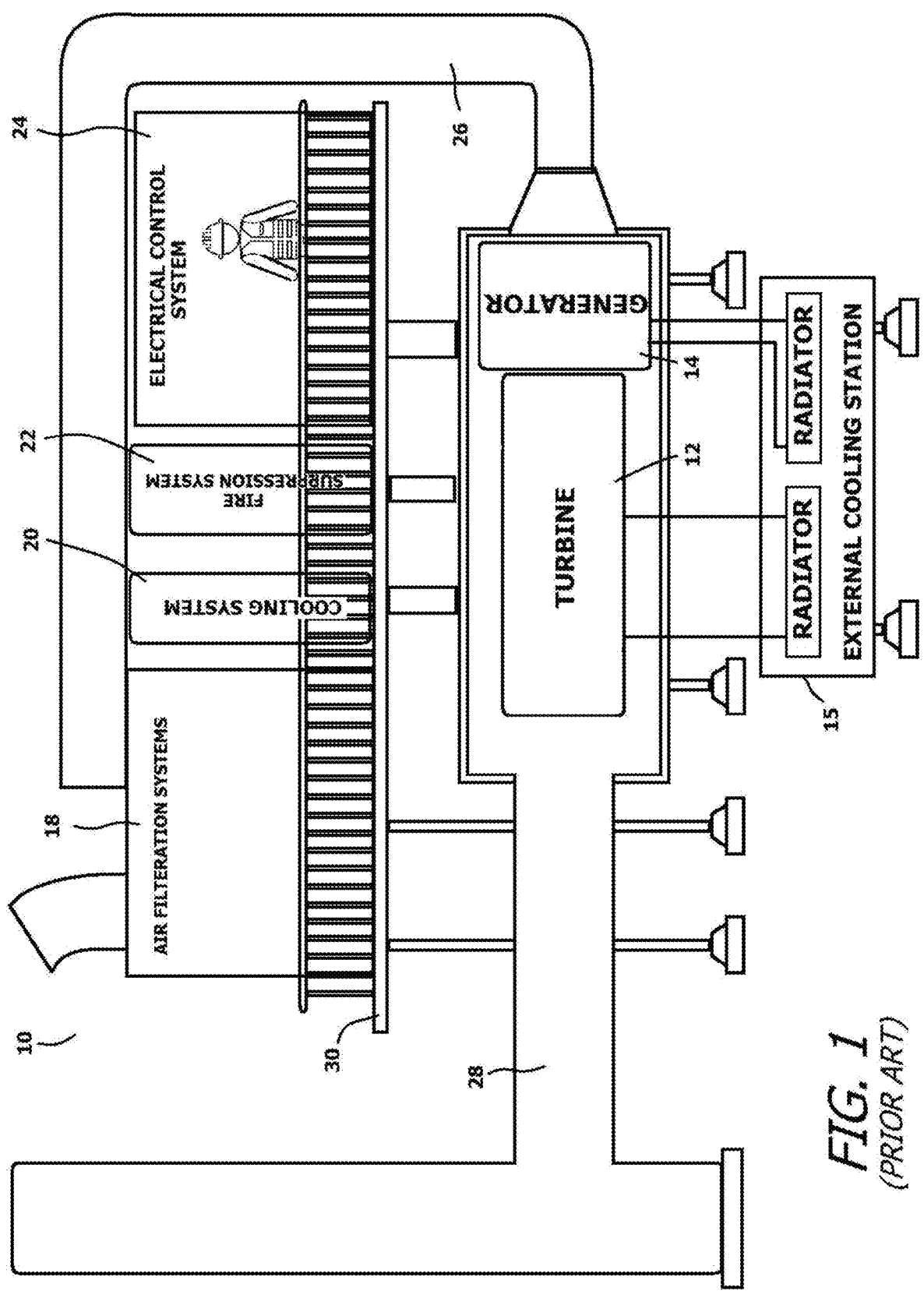
FIG. 1 depicts a side-view configuration of a prior art modular power station.

Referring to FIG. 1, a popular prior art configuration for a preassembled power station 10 is shown. In this configuration, a turbine 12 and generator 14 are set on footings 16 at, or near, ground level. The turbine 12 and generator are cooled by an external cooling system 15 by running auxiliary oil and coolant lines to the external cooling system 15. This positioning is primarily due to the weight and size of the components. The turbine 12 and generator 14 are sized to fit in a container unit for transportation purposes. The turbine 12 and generator 14 require other systems and components to operate. The other systems and components include, but are not limited to, an air filtration system 18, a combustion cooling system 20, a fire suppression system 22, and an electrical control center 24. These components are mounted above the turbine 12 and generator 14 in a manner to minimize the distance spanned by plumbing and electrical connections. Such a configuration is standard in the industry. One disadvantage of this traditional configuration is that the over-top positioning of the components requires the use of much longer air ducts 26 and exhaust ducts 28.

The air filtration system 18, turbine cooling system 15, combustion cooling system 20, fire suppression system 22 and electrical control center 24 are prefabricated components that are assembled on-site. Since these components are mounted above or adjacent to the turbine 12, a support framework 30 must be built around and above the turbine 12. Furthermore, the air filtration system 18, combustion cooling system 20, fire suppression system 22 and electrical control center 24 must be lifted into elevated positions on the support framework 30. This requires cranes and lifting equipment that can reach extended heights. The configuration also greatly limits the ability to access the turbine 12 and/or generator 14 with heavy equipment. As a consequence, if the turbine 12 or generator 14 need to be moved for maintenance or repair, much of the power station 10 must be disassembled. This action requires significant time, labor, and equipment.

Furthermore, by positioning the air filtration system 18, combustion cooling system 20, fire suppression system 22 and electrical control center 24 above the turbine 12, these components experience constant vibrational forces and elevated temperatures as the turbine 12 and generator 14 operate. This creates reliability issues since components in a heated vibrating environment have operational lives much shorter than the same components in a stationary environment at ambient temperature. The elevated position also makes the components difficult to access for monitoring and routine maintenance. Heat from the turbine 12 rises and heats any components above the turbine 12. Often the heat creates temperatures that are too high for prolonged human activity. Accordingly, in many instances, the turbine 12 must be stopped so that components mounted above the turbine 12 can be safely accessed by personnel for maintenance and repair. If the power station 10 is the only source of local power, shutting down the turbine 12 can be highly inconvenient. As such, routine maintenance is often delayed or not performed for the sake of convenience.

Figure 2:
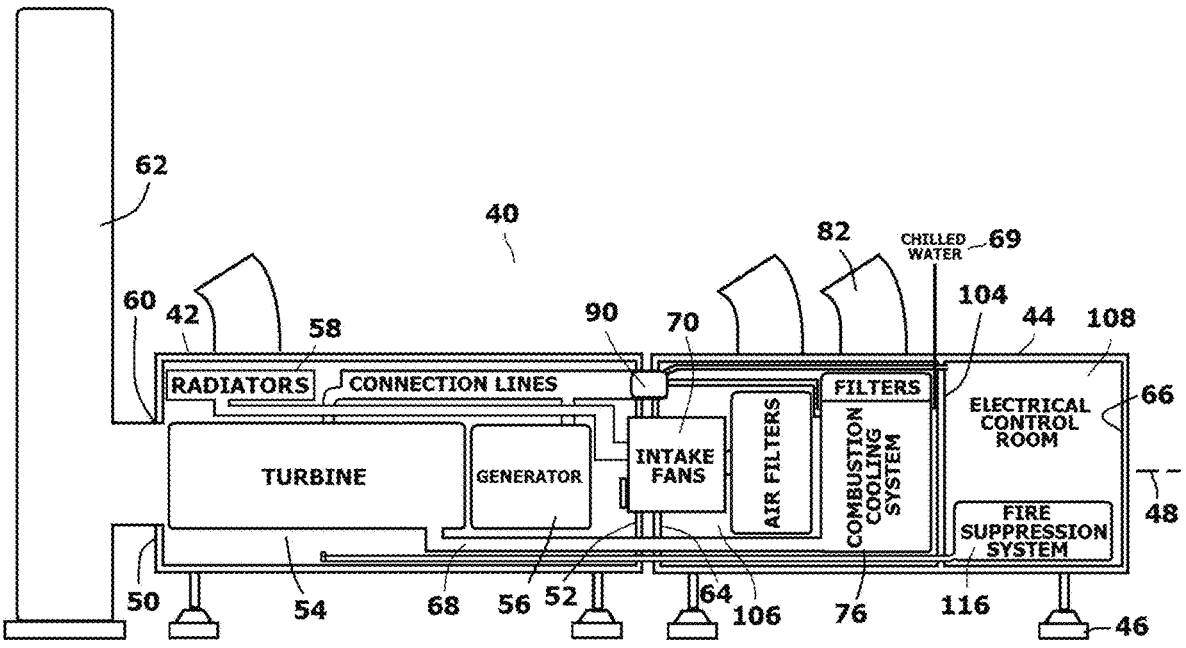
FIG. 2 depicts a side-view configuration of an improved modular power station.

The present invention system improves upon the prior art configuration of FIG. 1 and presents a significant advancement in the art. Referring to FIG. 2 in conjunction with FIG. 3, it can be seen that an improved power station configuration 40 is shown. The power station configuration 40 contains two modules 42, 44 of approximately the same length, width, and height. Each module 42, 44 is preferably transportable using vehicles and infrastructure designed to transport standard shipping containers, which can be over 12 feet wide, over 12 feet high and up to 40 ft long. The two modules 42, 44 are shipped to a construction site and are assembled on-site. The two modules 42, 44 are set on footings 46 or a concrete pad at, or near, ground level. The two modules 42, 44 abut and are linearly arranged along their shared long axis 48.

The first module 42 has a first wall 50 and an opposite second wall 52 that are perpendicular to the long axis 48. A turbine 54, a generator 56, and radiator system 58 are mounted between the first wall 50 and the second wall 52. The radiator system 58 is positioned in the first module 42 near the first wall 50 and adjacent the turbine 54. The generator 56 is positioned between the second wall 52 and the turbine 52. This positions the turbine 54 between the first wall 50 and the generator 56. An exhaust port 60 is formed through the first wall 50. The exhaust port 60 is preferably connected to an exhaust tower 62. The exhaust tower 62 is built separately, wherein the exhaust tower 62 channels the hot exhaust gases produced by the turbine 54 to a safe height.

The intake air required by the turbine 54 is supplied from the second module 44 through the second wall 52 of the first module 42. The second wall 52 of the first module 42 abuts against a first wall 64 of the second module 44. Air flow openings are provided in the second wall 52 of the first module 42 and the first wall 64 of the second module 44. The airflow openings enable air to flow into the first module 42 from the second module 44 for different purposes.

Air supply to the turbine 54 passes through a first supply conduit 68. The first air supply conduit extends to a combustion cooling system 76 on the second module. As will be later explained, the combustion cooling system 76 uses a chilled water supply 69 to cool the ambient air being drawn into the turbine 54. The combustion cooling system 76 can be bypassed if needed.

Air also flows into the first module 42 using air intake fans 70. The air intake fans 70 draw air from the second module 44 and force that air into the first module 42. The air drawn by the air intake fans 70 is not utilized by the turbine 54. Rather, the air drawn by air intake fans 70 is directed to serve two purposes. First, the drawn air is used to ventilate the first module 42 and help prevent heat from building up around the exteriors of the generator 56 and turbine 54. Second, the air moved by the air intake fans 70 is moved through the radiator system 58. The radiator system 58 cools coolant and oil that circulates through the turbine 54 and generator 54.

The air that is drawn by the air intake fans 70 is drawn through a first set of air intake filters 72. The air intake filters 72 are held in the second module 44. The second module 44 contains multiple filter compartments 74 for receiving and holding replaceable air intake filters 72. The filter compartments 74 are accessible to maintenance personnel from outside the second module 44. When the air intake filters 72 are in the filter compartments 74, the air intake filters 72 are aligned at a common elevation that is easily accessed within the filter compartments 74 by maintenance personnel standing at ground level on the outside of the second module 44.

Figure 3:
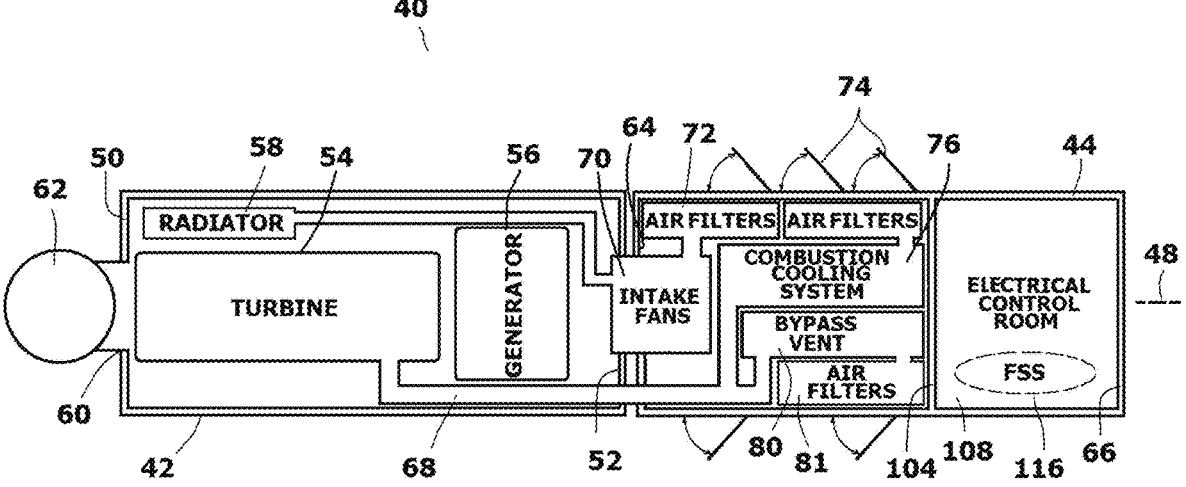
FIG. 3 depicts a top-view configuration of the improved modular power station of FIG. 2.
Figure 4:
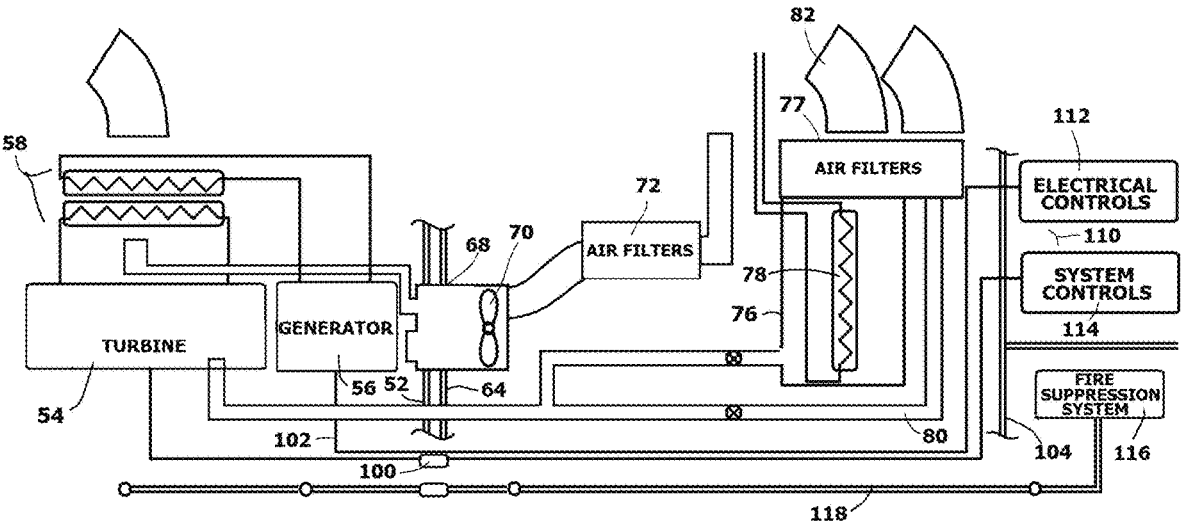
FIG. 4 is a block diagram schematic illustrating the fluid flow operations within the improved modular power station.

Referring to FIG. 4 in conjunction with FIG. 2 and FIG. 3, it can be seen that ambient air drawn by the air intake fans 70 are drawn through the air intake filters 72. As such, the air ventilating the first module 42 and the air cooling the radiator system 58 is filtered and clean. Separately, the air drawn by the turbine 54 is drawn through the combustion cooling system 76. Prior to entering the combustion cooling system 76, the air is drawn through a second set of air filters 77. The combustion cooling system 76 contains a heat exchanger 78 that cools the filtered incoming air using chilled water 69. Accordingly, the air drawn into the turbine 54 is both filtered and cooled below ambient. This helps turbine 54 run at peak efficiency in many environments.

In circumstances where the ambient air is cold, the air drawn by the turbine need not be cooled. A bypass vent 80 is provided. The bypass vent 80 provides a passage for air to circumvent the cooling provided by the combustion cooling system 76. This enables air to reach the turbine 54 without any pressure loss in the flowing air caused by the passage of air through other elements. The bypass vent 80 also utilizes the air filters 77 to ensure that no dirt or debris is passed from the ambient environment into the first module 42. One or more intake ports 82 are provided through the ceiling of the second module 44 to facilitate the intake of ambient air.

Returning to FIG. 2 and FIG. 3, it can be seen that conduit openings 90 are formed in the second wall 52 of the first module 42 and the first wall 64 of the second module 44. The conduit openings 90 include one or more cable openings 100 for receiving the power transmission line(s) 102 of the generator 56.

A bulkhead 104 is formed in the second module 44. The bulkhead 104 divides the second module 44 into a forward compartment 106 and a rearward compartment 108. The air supply and cooling components are positioned in the forward compartment 106 between the first wall 64 of the second module 44 and the bulkhead 104. An electrical control center 110 is positioned behind the bulkhead 104 in the rearward compartment 108 between the bulkhead 104 and the second wall 66 of the second module 44. The electrical control center 110 in the rearward compartment 108 is environmentally isolated from the adjacent forward compartment 106. Furthermore, the bulkhead 104 protects the electrical control center 110 from any heat, oil spills, coolant spills and the like that may occur in the forward compartment 106. The electrical control center 110 contains the electrical equipment 112 needed to control and direct the output of the generator 56. The electrical control center 110 also contains control equipment 114 and displays needed to monitor and control the operation of the turbine 54, generator 56, and the various valves and fans. The equipment 112, 114 in the electrical control center 110 is isolated from the high temperatures surrounding the turbine 54 and the generator 56. Furthermore, the equipment 112, 114 in the electrical control center 110 is as far away as possible from the turbine 54 and generator 56 in the first module 42. Accordingly, the vibrations experienced by the equipment 112, 114 are minimized.

The electrical control center 110 has a floor layout with enough open space to accommodate at least one person. Within the dimensions of the second module 44, the floor of the electrical control center 110 can be elevated by up to two feet and still leaves enough room for a person to stand. By elevating the floor of the electrical control center 110, space is created in the rearward compartment 108 for a fire suppression system 116 under the floor. By being in the rearward compartment 108, the fire suppression system 116 is also isolated from the heat and contaminants present in the forward compartment 106. This enables the fire suppression system 116 to last much longer than if otherwise positioned. The fire suppression system 116 contains fire suppression chemicals under pressure. If heated and shaken by vibrations, pressure can leak, and chemical can degrade. This is why fire extinguishers have expiration dates.

The fire suppression system 116 contains conduits 118 for channeling the fire suppression chemicals into the first module 42 and the forward compartment 106 of the second module 44. The conduits 118 pass through the bulkhead 104, the first wall 64 of the second module 44 and the second wall 52 of the first module 42.

The first module 42 and the second module 44 are shipped to a location and set on footings 46 or a base pad. The first module 42 and the second module 44 are set at one elevation. The second module 44 extends away from one end of the first module 42. Accordingly, the second module 44 can be easily accessed without any danger or heat exposure associated with the operation of the turbine 54 and/or generator 56 in the first module 42. Furthermore, in the present invention configuration, the turbine 54, generator 56 and/or radiator system 58 can be removed, replaced, or repaired without any effect upon the other systems in the second module 44. Additionally, there are no constricted areas created by surrounding framework of the presence of any equipment above the turbine 54, generator 56 and radiator system 58. In this manner, the turbine 54, generator 56 and radiator system 58 can be easily accessed by heavy equipment for replacement or repair without having to disassemble the remainder of the power station.

It will be understood that the embodiment of the present invention that is illustrated and described is merely exemplary and that a person skilled in the art can make many variations to that embodiment. For example, the number of air filters, the number of access panels, and the position of air intakes are all a matter of need and design choice. All such embodiments are intended to be included within the scope of the present invention as defined by the appended claims.

7

8

What is claimed is:

1. A power station configuration, comprising:

a portable first module containing a turbine engine and an electrical generator that is powered by said turbine engine, wherein said first module includes a first wall;

a portable second module containing air filters, an air cooling system and a control room for operating said turbine engine and said electrical generator, wherein said second module has a second wall, wherein said first module is placed in abutment with said second module so that said first wall of said first module is adjacent said second wall of said second module;

a first air conduit extending into said first module from said second module, wherein said first air conduit provides air for use in combustion by said turbine;

a second air conduit extending into said first module from said second module, wherein said second air conduit provides air for cooling said turbine;

intake fans set into said second air conduit between said first wall and said second wall for drawing air through said second air conduit.

2. The power station configuration according to claim 1, further includes a radiator system in said first module for cooling said turbine, wherein said radiator system is cooled with air drawn through said second air conduit.

3. The power station configuration according to claim 1, wherein said air cooling system in said second module actively cools air drawn through said first air conduit.

4. The power station configuration according to claim 3, further including a bypass for drawing air from said second module through said first air conduit without the air passing through said air cooling system.

5. The power station configuration according to claim 1, wherein said second module is internally divided between a forward compartment that faces the first module and a rearward compartment that faces away from said first module.

6. The power station configuration according to claim 5, wherein said air filters and air cooling system are in said forward compartment and said control room is in said rearward compartment.

7. The power station configuration according to claim 6, further including a fire suppression system based in said rearward compartment under said control room, wherein fire suppression conduits interconnect said fire suppression system with said first module and said forward compartment.

8. The power station configuration according to claim 1, wherein said first module and said second module are no larger than standard shipping containers.

9. A power station configuration, comprising:

a turbine engine, an electrical generator, and a radiator system for cooling said turbine and said generator preassembled in a first module;

air filters, an air cooling system and a control room preassembled in a second module;

wherein said first module and said second module are linearly aligned end to end;

a first air conduit and a second air conduit extending from said second module into said first module, wherein air flowing through said first air conduit is used for combustion in said turbine and air from said second air conduit is used to cool said radiator system; and intake fans for moving air from said second module into said first module through said second air conduit.

10. The power station configuration according to claim 9, wherein said air filters include a first set of air filters for filtering air drawn into said first air conduit and a second set of air filters for filtering air drawn into said second air conduit.

11. The power station configuration according to claim 9, wherein said air cooling system in said second module actively cools air draw through said first air conduit.

12. The power station configuration according to claim 11, further including a bypass for drawing air through said first air conduit without the air passing through said air cooling system.

13. The power station configuration according to claim 9, wherein said second module is internally divided between a forward compartment that faces the first module and a rearward compartment that faces away from said first module.

14. The power station configuration according to claim 13, wherein said air filters and said air cooling system are in said forward compartment and said control room is in said rearward compartment.

15. The power station configuration according to claim 13, further including a fire suppression system based in said rearward compartment under said control room, wherein fire suppression conduits interconnect said fire suppression system with said first module and said first compartment.

16. The power station configuration according to claim 9, wherein said first module and said second module are no larger than standard shipping containers.

17. A method of configuring a power station, comprising:

providing a first module containing a turbine engine and an electrical generator;

providing a second module containing air filters, an air cooling system, and a control room;

setting said first module and said second modules on footings where said first module and said second module are linearly aligned end to end;

providing a first air conduit that supplies air to said turbine for combustion;

providing a second air conduit that supplies air into said first module to cool said turbine;

filtering air flowing through said first air conduit and said second air conduit in said second module using said air filters.

18. The method according to claim 17, further including providing a radiator system in said first module, wherein said radiator system is cooled using air drawn through said second air conduit.

* * * * *